UNITED STATES PATENT OFFICE.

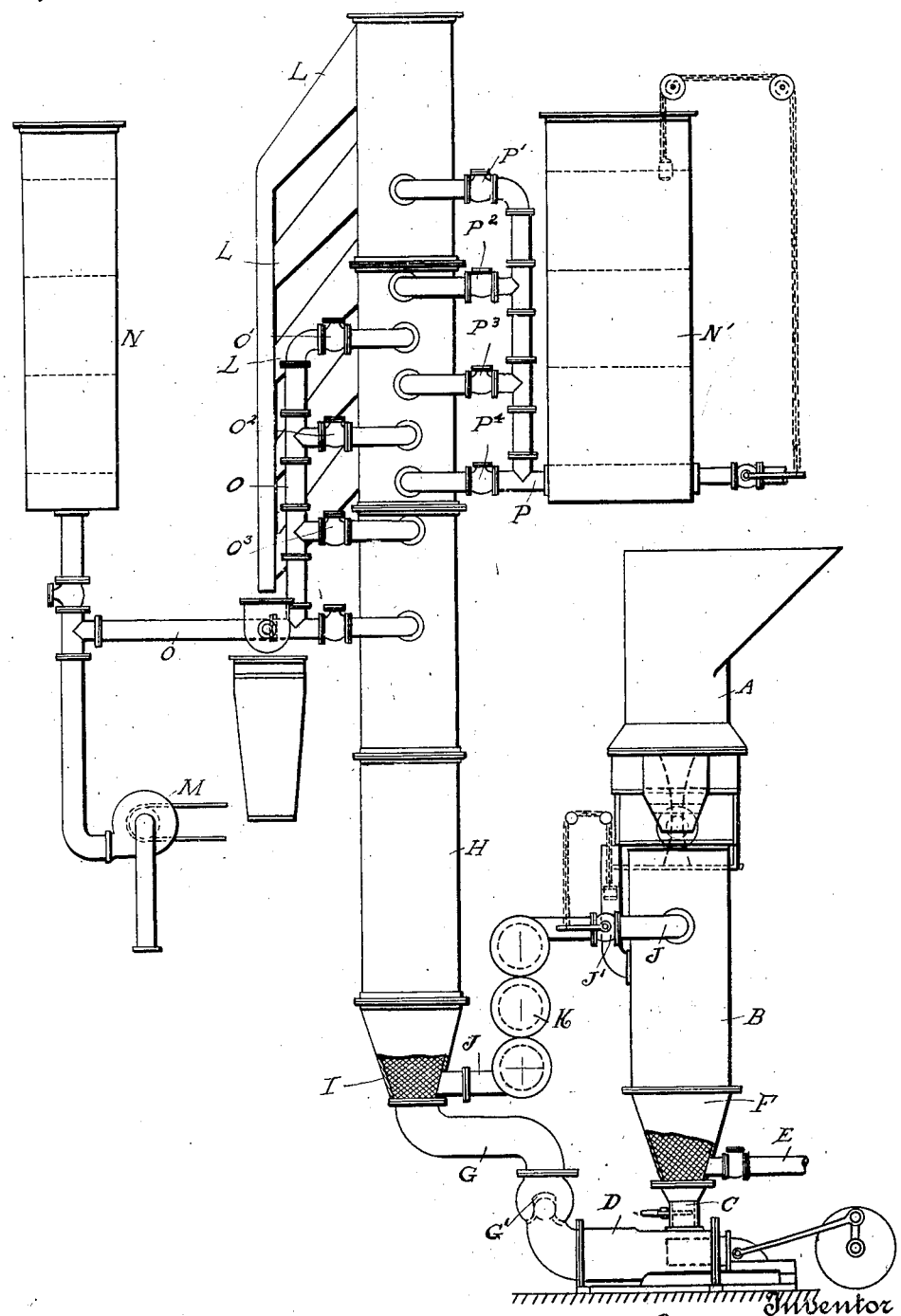

KARL PHILIPP, OF MAGDEBURG, GERMANY.

CONTINUOUS JUICE EXTRACTION BY DIFFUSION.

934,349. Specification of Letters Patent. Patented Sept. 14, 1909.

Application filed May 24, 1907. Serial No. 375,523.

*To all whom it may concern:*

Be it known that I, KARL PHILIPP, engineer chemist, a subject of the German Emperor, residing at 41 Bismarckstrasse, Magdeburg, Germany, have invented certain new and useful Improvements in or Relating to Continuous Juice Extraction by Diffusion; and I do hereby declare the following to be a full, clear, and exact description of the invention, such as will enable others skilled in the art to which it appertains to make and use the same.

My invention relates to processes of obtaining juices by diffusion and is especially designed for the treatment of sliced beets, but is generally suitable for any lixiviation process.

According to this process the diffusion is accomplished in a high column in which the material under treatment is forced upward at intervals against the liquid, the pressure being greatest at the point where the liquid is most concentrated, that is, charged with the greatest amount of material extracted from the sliced beets, the pressure gradually decreasing until the top of the column is reached. The greater part of the sugar contained in the beets is therefore extracted near the base of the column, where the liquid is most concentrated. At the same time, a part of the concentrated juice is drawn off from the base of the column, heated, and delivered upon a fresh portion of the material under treatment. The material mixed with the juice is then forced upward at intervals into the column, a part of the concentrated juice being drawn off and passing to the purifier, but enough liquid being left to enable the mixed mass to be easily moved.

In the accompanying drawing, the figure represents in side elevation, partly in section, an apparatus for carrying out my process.

A represents a slicing machine of any ordinary or approved type, into which the beets are delivered. The slices are then delivered into a mashing vessel B, of any approved type, through a chute. In the mashing vessel B, the beets are mixed with concentrated liquid which is delivered into the mashing vessel through the pipe J. From the mashing vessel B the mashed material, mixed with juice, passes downward through a tapering chute into the casing of a pump D. Within this inclined chute is a sieve F, through which a portion of the juice passes out, and a valved pipe E provided with a suitable valve is connected to the space outside of the sieve or screen F and conveys away a portion of the concentrated juice to the purifier. The pump D, which is a reciprocating pump, delivers the mashed material mixed with juice by successive impulses up through the pipe G into the base of the high column H, a check valve G' being used to prevent the return of the material on the back stroke of the pump. Within the lower tapered end of the column H, is a screen I, and connected with the space between this screen and the bottom of the column H is a pipe J, which delivers the concentrated juice from the bottom of the column in the mashing vessel B.

K represents a heater of any desired type, interposed between the parts of the pipe J. This pipe is provided with a valve J' which is automatically operated by a float in the masher B.

Connected to the column H is a branched pipe P, the branches of said pipe entering the column at intervals and being provided with valves $P^1$, $P^2$, $P^3$, $P^4$ in the various branches. This is for the purpose of admitting liquid at various heights to the column H, the pipe P being connected to a water reservoir N', which is preferably partly filled with hot, clear water. The height of the liquid in the tank N' is regulated by a float valve therein.

L represents chutes arranged at different heights along the column H and communicating with the interior thereof, through which the treated material is drawn off at different heights and passes to the ordinary presses, after which the pressed material is delivered to a suitable receptacle, and the water is led either into a tank or back into the column H.

O represents a pipe into which the water from the presses is delivered, and this pipe connects with the tank N, and also by means of various branches with the column H at different heights thereon, each of said branches being provided with a valve, such as $O^1$, $O^2$, $O^3$.

M represents a pump for forcing the water in the pipe O either into the tank N or into the column H, as may be desired. Valves are arranged so that the slice water may be conveyed either into the tank or into the column H at various heights therein, or partly into both; and likewise either the slice water alone may be fed into the column H, or pure water alone or both.

The operation is as follows: The column H being filled with clear, hot water to the desired height, beets are fed into the slicing machine A, and when sliced fall into the mashing vessel B, where they are mixed with water. The mashed slices mixed with water then pass downwardly into the pump D, the valve in the pipe E being closed. The mashed material is then forced at regular intervals upward through the pipe G into the bottom of the column H, and thereafter the operation is continued, a part of the concentrated juice returning through the pipe J and heater K into the vessel B. After the water in the lower part of the column H has been fully charged with the lixiviated material, a portion is allowed to run out through the pipe E, and one of the valves in the branch pipe F being opened, a fresh supply of water is delivered into the column H as the level in said column falls. Meantime, the water separated from the sliced material by the press is also returned, when desired, into the upper part of the column.

The distinctive features of my process are as follows: 1. The introduction of the material to be lixiviated into the vertical column at its lowest point in opposition to the pressure of the entire liquid column. 2. The arrangement whereby the material in its freshest state is subjected to the juice of the highest degree of concentration, while the partially treated material is subjected to specifically lighter liquid as the material is forced upwardly through the column. 3. The movement of the liquid and material under treatment upward in a straight line. 4. The gradual withdrawal of a part of the most concentrated liquid from the base of the column and the mixing of said concentrated liquid with fresh material to be treated, and the gradual withdrawal of the concentrated juice to the purifier. 5. The heating of the juice in its passage from the base of the high column into the mashing or preparation vessel. 6. The forcing of the material upward through the column by a single pump, a check valve being provided to prevent the return of the material.

Having thus described my invention, I claim:

1. The process of obtaining juices by diffusion, which consists in forcing the material under treatment, mixed with liquid, upward in a vertical column, withdrawing a part of the liquid at the base of the column, mixing the liquid withdrawn with a fresh portion of the material and allowing a part of the liquid to flow off from said mixture, substantially as described.

2. The process of obtaining juices by diffusion, which consists in comminuting the material under treatment, mixing it with hot liquid already charged with juice, allowing a part of the concentrated liquid to flow off, continuously pumping the remaining mixture upward in a vertical column, withdrawing part of the liquid from the base of said column, and heating the liquid withdrawn, said liquid being mixed with a fresh portion of the material under treatment, substantially as described.

Dated this 13th day of May 1907.

In testimony whereof, I affix my signature, in presence of two witnesses.

KARL PHILIPP.

Witnesses:
HERMANN FOOSBRUSSOR,
HERMANN HOPPE.